(12) United States Patent
Cole et al.

(10) Patent No.: US 10,408,333 B2
(45) Date of Patent: Sep. 10, 2019

(54) REAR AXLE LUBRICATION OIL TEMPERATURE CONTROL USING EXHAUST HEAT RECOVERY AND A THERMAL BATTERY

(71) Applicant: Ford Global Technologies, LLC, Dearborn, MI (US)

(72) Inventors: Cary Cole, Livonia, MI (US); Sunil Katragadda, Canton, MI (US); Phillip Bonkoski, Ann Arbor, MI (US); David Karl Bidner, Livonia, MI (US); Michael Levin, Ann Arbor, MI (US); Colby Jason Buckman, Brownstown, MI (US); Danrich Henry Demitroff, Okemos, MI (US); Amey Y. Karnik, Canton, MI (US); Furqan Shaikh, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 515 days.

(21) Appl. No.: 14/964,332

(22) Filed: Dec. 9, 2015

(65) Prior Publication Data

US 2017/0167595 A1 Jun. 15, 2017

(51) Int. Cl.
| | | |
|---|---|---|
| F28F 27/00 | (2006.01) |
| F16H 57/04 | (2010.01) |
| F28F 27/02 | (2006.01) |
| F28D 20/00 | (2006.01) |
| F28D 20/02 | (2006.01) |
| F28D 21/00 | (2006.01) |

(52) U.S. Cl.
CPC ......... *F16H 57/0417* (2013.01); *F28F 27/02* (2013.01); *F28D 20/0034* (2013.01); *F28D 20/02* (2013.01); *F28D 21/0003* (2013.01); *F28D 2021/0089* (2013.01)

(58) Field of Classification Search
CPC .. F16H 57/0413; F16H 57/0417; F28F 27/02; F28D 20/003; F28D 20/0034; F28D 20/02; F28D 20/021; F28D 21/0003; F28D 2021/0089; F01M 5/00; F01M 5/005

See application file for complete search history.

(56) References Cited

U.S. PATENT DOCUMENTS

| | | | |
|---|---|---|---|
| 6,141,961 A * | 11/2000 | Rinckel | F01N 3/043 60/274 |
| 6,758,266 B1 | 7/2004 | Sjunnesson et al. | |

(Continued)

FOREIGN PATENT DOCUMENTS

| | | |
|---|---|---|
| DE | 102011013129 A1 | 12/2011 |
| WO | 2014031350 A1 | 2/2014 |

*Primary Examiner* — Travis C Ruby
(74) *Attorney, Agent, or Firm* — Julia Voutyras; McCoy Russell LLP

(57) ABSTRACT

Methods and systems are provided for regulating the temperature of rear axle lubrication oil. In one example, a rear axle coolant system may include a coolant loop with a plurality of valves and sensors, regulating the coolant flow in heat exchange relationship with an exhaust gas heat recovery and storage system to deliver warm coolant to a rear axle heat exchanger to warm the rear axle lubrication oil. The method may regulate the components of the rear axle coolant system through a controller, receiving sensor input from the components of the coolant system.

14 Claims, 4 Drawing Sheets

(56) References Cited

U.S. PATENT DOCUMENTS

| | | | |
|---|---|---|---|
| 6,899,074 B1 | 5/2005 | Carlsson | |
| 6,997,284 B1* | 2/2006 | Nahrwold | F16H 57/0447 165/117 |
| 8,485,932 B2 | 7/2013 | Beechie et al. | |
| 2005/0051322 A1* | 3/2005 | Speer | B60H 1/18 165/284 |
| 2007/0137594 A1* | 6/2007 | Boudard | B60H 1/00314 123/41.57 |
| 2008/0148827 A1* | 6/2008 | Keski-Hynnila | G01M 15/05 73/114.31 |
| 2008/0251303 A1* | 10/2008 | Rouaud | B60K 6/26 180/65.27 |
| 2012/0279699 A1 | 11/2012 | Kim | |
| 2013/0061584 A1* | 3/2013 | Gerges | F01N 5/02 60/320 |
| 2014/0251579 A1* | 9/2014 | Sloss | F01N 5/02 165/96 |

\* cited by examiner

REAR AXLE LUBRICATION OIL TEMPERATURE CONTROL USING EXHAUST HEAT RECOVERY AND A THERMAL BATTERY

FIELD

The present description relates generally to methods and systems for controlling rear axle lubrication oil temperature in a vehicle.

BACKGROUND/SUMMARY

The powertrain in a conventional rear wheel drive vehicle includes a rear axle or differential system that may include axle members and gear sets, transmitting power from a drive shaft to the axle members to propel the vehicle. The rear axle gear sets may be lubricated by lubricating oil to ensure smooth operation of the rear axle differential. Viscosity and other fluid properties of the lubrication oil are a function of temperature and affect the efficiency and performance of the rear axle system and thus the vehicle. The rear axle lubricating oil may be less viscous with increasing temperature and may be more viscous with decreasing temperature. For example, at engine cold start the lubricating oil may be cold and hence, more viscous than desired. Conversely, for example, at high engine load the rear axle lubricating oil may be over-heated and may be less viscous than desired. To minimize friction loss and to reduce wear of the rear axle gears, which may result in reduced fuel efficiency, it is desirable to monitor the rear axle lubrication oil temperature and to maintain the lubrication oil temperature within a specified temperature range for optimal lubrication of the rear axle gears.

To address the problem of differential warm up, an example method is shown in U.S. Pat. No. 6,899,074, including the use of a coolant loop with a heat exchanger system coupled to the rear axle to regulate the temperature of the rear axle lubrication oil. In another approach shown in U.S. Pat. No. 8,485,932, an electric heating and cooling element is coupled to the rear axle to regulate the temperature of the rear axle lubrication oil.

However, the inventors herein have recognized potential issues with such systems, including the absence of a means to capture and store additional heat energy that may be available in a rear axle coolant system and the ability to deplete the stored heat energy to meet immediate rear axle lubrication oil heating demands. Accordingly, a system is provided herein to at least partly address the above issues. In one example, a rear axle coolant system may include an exhaust heat recovery system to transfer heat from an engine exhaust system to a cooling fluid, a rear-axle heat exchanger to transfer heat between the cooling fluid and rear axle lubrication oil, and a thermal battery system positioned intermediate the exhaust heat recovery system and the rear-axle heat exchanger, the thermal battery system configured to store excess heat from the exhaust heat recovery system. In one example, the rear axle coolant system may further include a controller storing instructions executable to, responsive to a first condition, bypass exhaust gas around the exhaust gas heat recovery system and flow cooling fluid from the thermal battery system to the rear-axle heat exchanger, and responsive to a second condition, bypass exhaust gas around the exhaust gas heat recovery system and flow cooling fluid from the exhaust gas heat recovery system to the rear-axle heat exchanger, bypassing the thermal battery system and flowing cooling fluid through the rear-axle heat exchanger to remove heat from the rear axle lubrication oil. In one example, the first condition may comprise the rear axle lubrication oil temperature above a threshold temperature and thermal battery system temperature lower than the rear axle lubrication temperature, and the second condition may comprise the rear axle lubrication oil temperature above the threshold temperature and thermal battery system temperature equal to or greater than the rear axle lubrication temperature.

In this way, the temperature of rear axle lubrication oil may be regulated through an exhaust gas heat recovery and storage system, including an exhaust gas heat exchanger and a thermal battery system coupled to a rear axle coolant loop communicating with a rear axle heat exchanger. The thermal battery system may store unused, additional heat recovered from the exhaust gas and may provide the stored thermal energy back to the rear axle coolant loop when there is a need for additional heat energy. The coolant flow through the above mentioned heat exchangers and the coolant loop may be regulated by a coolant pump and associated valves, controlled by a controller receiving sensor input from sensors located along the coolant loop.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
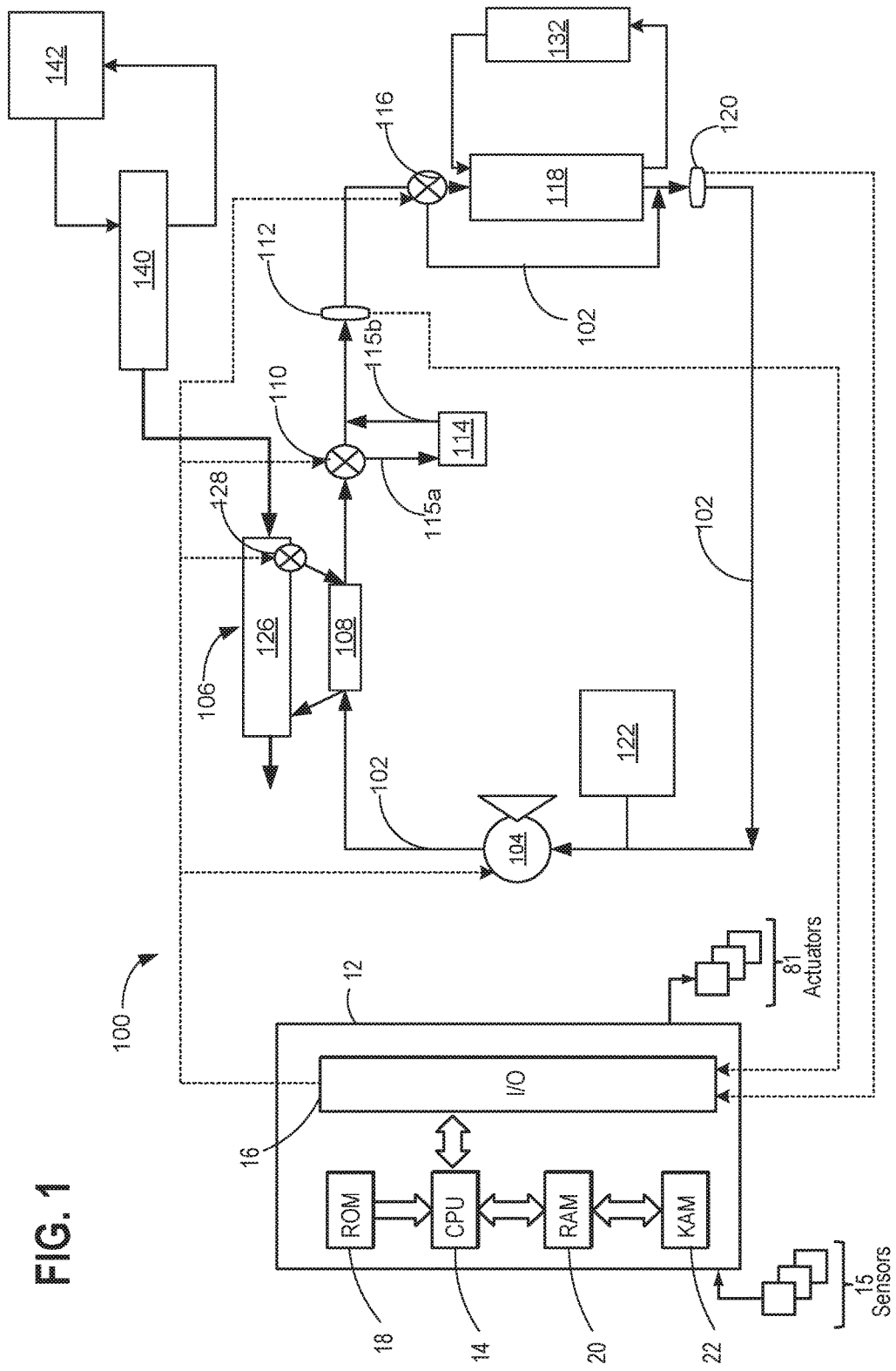
FIG. 1 shows an example of a rear axle cooling system including a coolant loop coupled to an exhaust gas heat recovery and storage system and to a rear axle heat exchanger.
Figure 2:
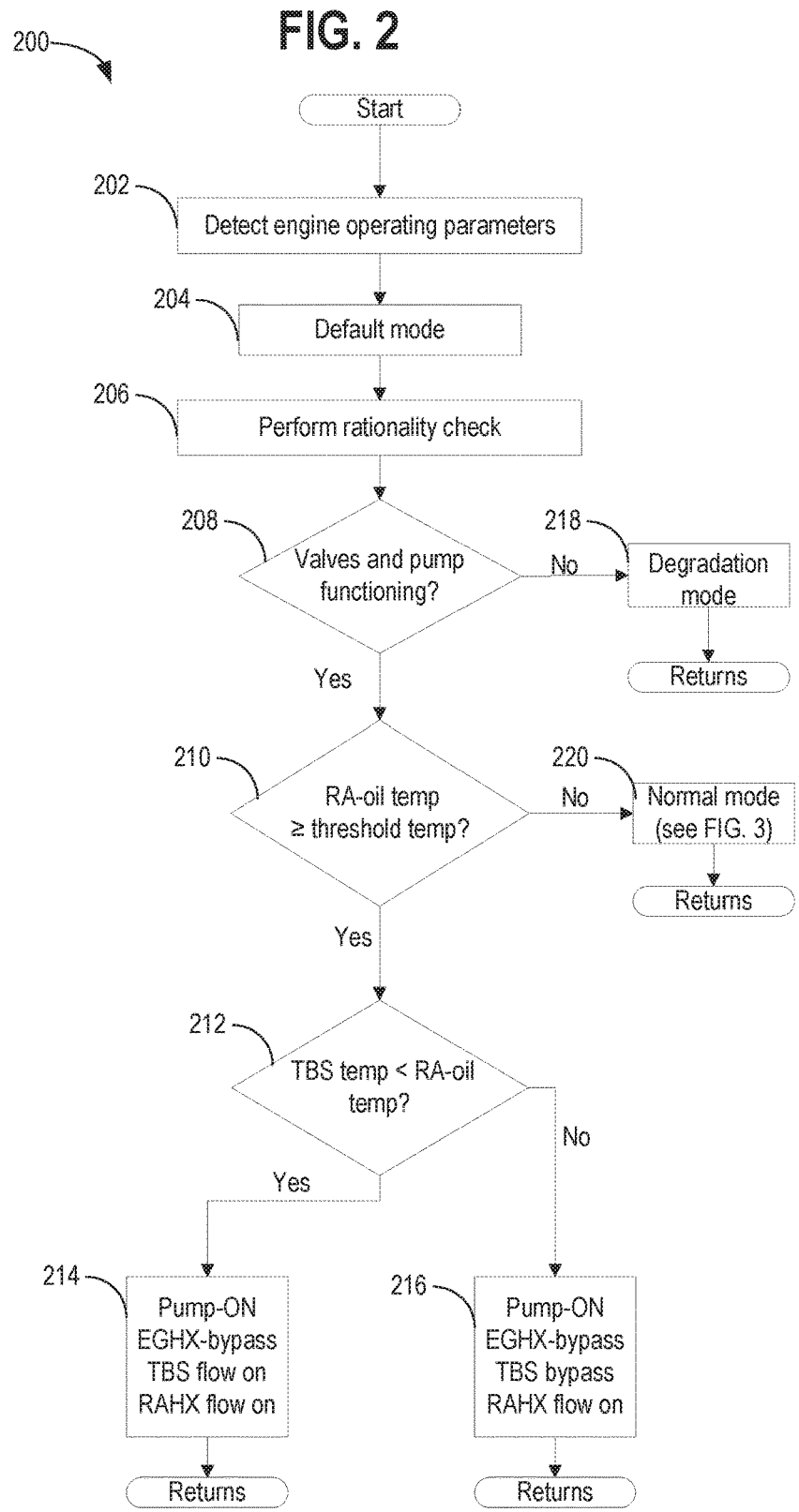
FIG. 2 shows a method for regulating rear axle lubrication oil temperature through a coolant loop coupled to an exhaust gas heat recovery and storage system and to a rear axle heat exchanger.
Figure 3:
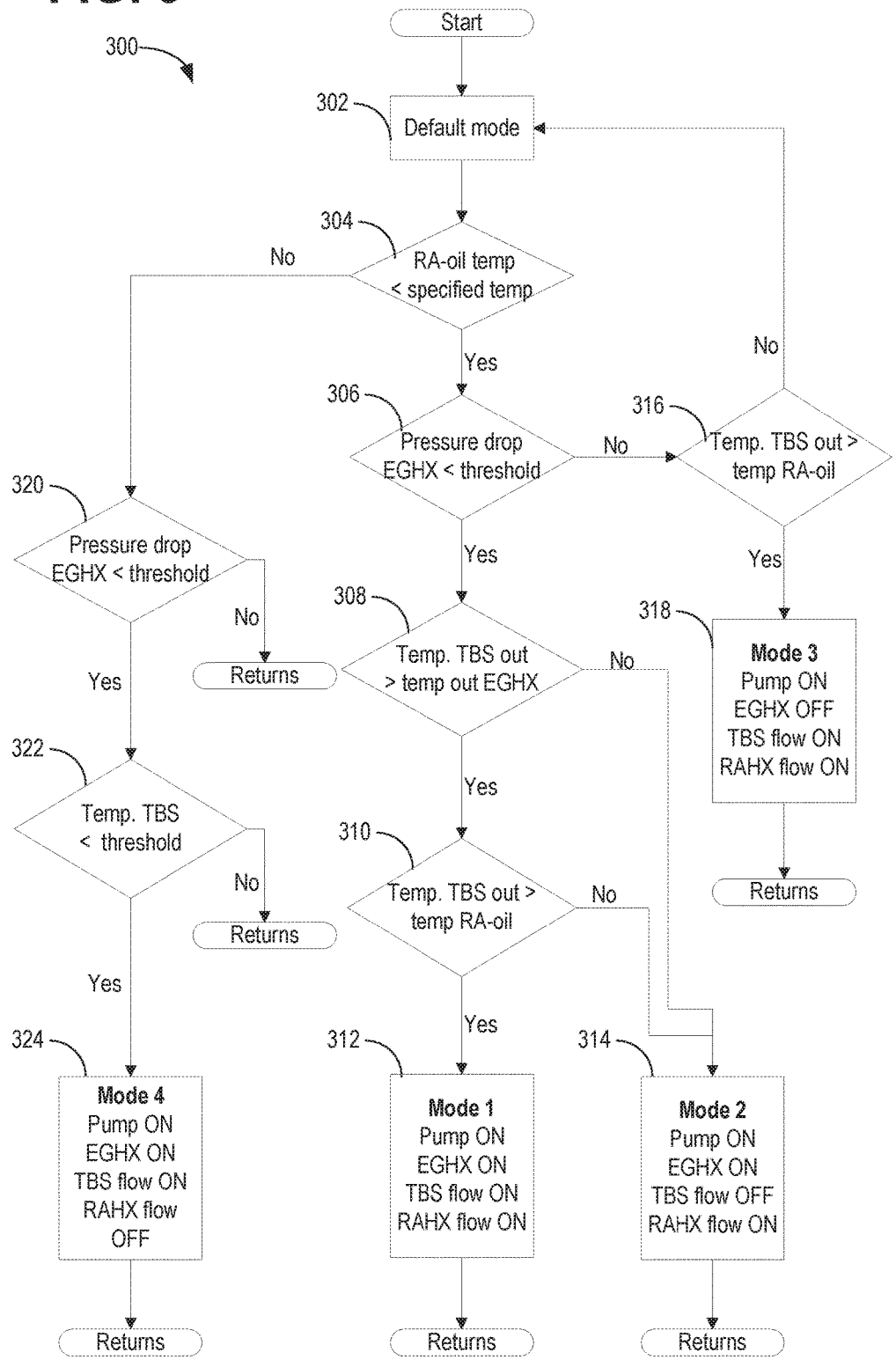
FIG. 3 shows a continuation of the method of FIG. 2, regulating the rear axle lubrication oil temperature.
Figure 4:
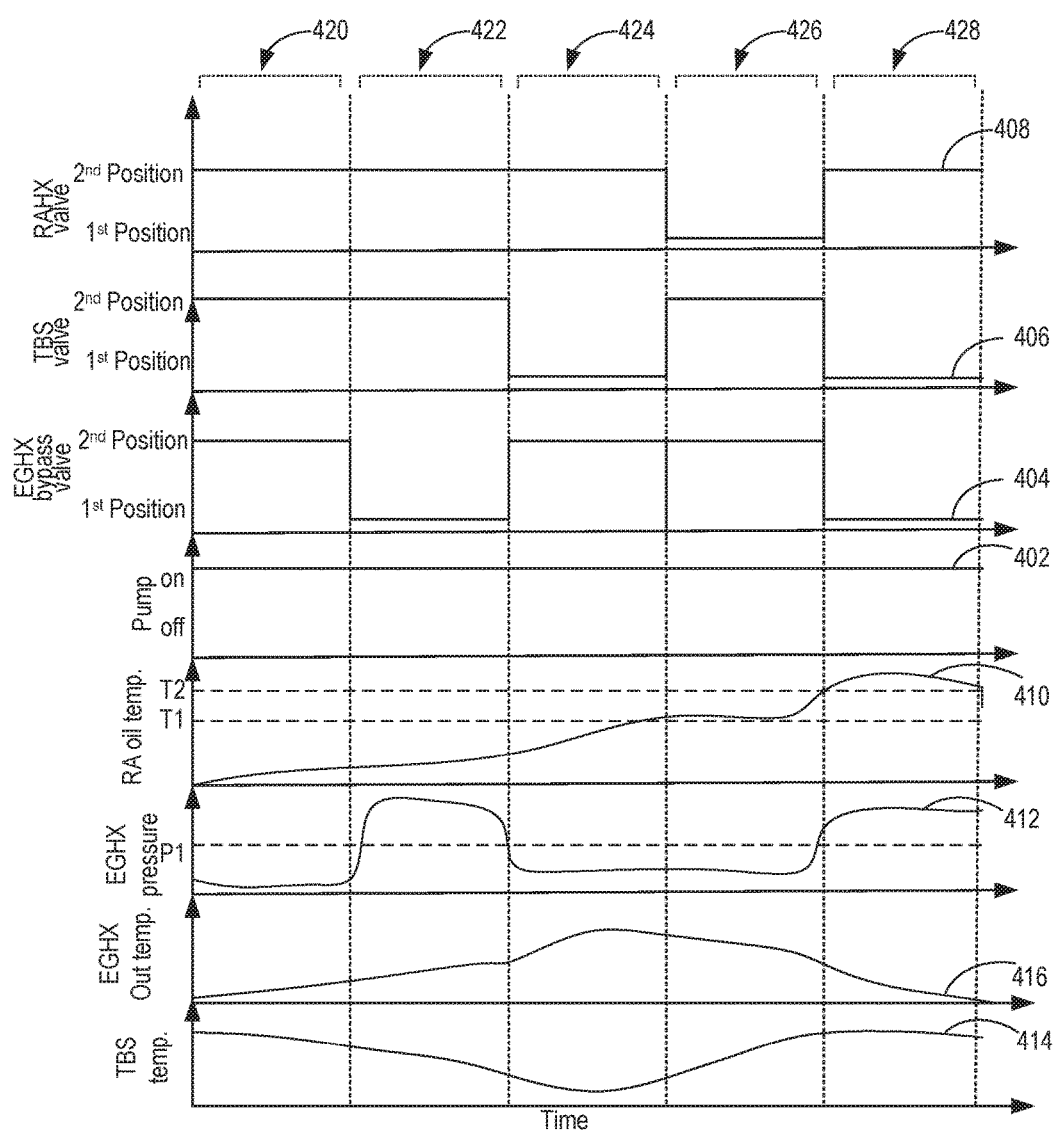
FIG. 4 illustrates example plots showing operation of a pump and position of the valves of a rear axle coolant system during various rear axle lubrication oil temperature conditions.

The following description relates to systems and methods for regulating the temperature of the rear axle lubrication oil. The lubrication oil temperature directly affects the viscosity of the rear axle lubrication oil, thus influencing the properties of the oil lubricating the rear axle gears. It is desirable to maintain the rear axle lubrication oil within a specified temperature range, avoiding over heating or cooling of the rear axle lubricating oil. The rear axle lubrication oil is more viscous than typical engine or transmission oil. The reason for thicker rear axle lubrication oil is that at high temperatures, such as desert towing, the hypoid gear set of the rear axle has more slip and lube shear than straight cut gears, requiring a thicker oil for proper lubrication. Although the rear axle warms slowly throughout use due to internal frictional heat, the lower efficiency power transmission before the rear axle lubrication oil is warm may result in a direct loss in fuel efficiency. Further, the higher viscosity rear axle lubrication oil takes longer to warm up to operating temperature than engine coolant, for example, and thus if the rear axle lubrication system is heated via the engine coolant, the rear axle lubrication oil may be at a lower-than desired temperature, even when the engine is fully warmed. To regulate the temperature of the rear axle lubrication oil, FIG. 1 shows a rear axle coolant system, including a coolant loop that may recover heat energy from an exhaust gas heat exchanger, may store excess heat energy in a thermal battery storage system or deplete heat from the coupled thermal battery storage system, and flow the coolant to a rear axle heat exchanger to regulate the temperature of the rear axle lubrication oil. FIGS. 2 and 3 show an example method where a controller controls the components of a rear axle coolant system depending on sensor input being relayed from the rear axle coolant system. FIG. 4 illustrates example plots showing pump operation and valve positions of a rear axle coolant system being regulated by a controller at various rear axle lubrication oil temperature conditions.

FIG. 1 shows an example of a cooling system 100 including an exhaust gas heat storage and recovery system with valve-regulated coolant flow through a coolant loop, which may be included in an engine system. In an embodiment of the cooling system 100, coolant is circulated via coolant line 102 by a fluid pump 104. In one example, the fluid pump 104 may be electrically driven, via an alternator or battery, for example. In a further example, the fluid pump 104 may be mechanically driven, via an engine, for example. The direction of coolant flow in the coolant line 102 is indicated by arrows.

The cooling system 100 couples the coolant line 102 to an Exhaust Gas Heat Recovery (EGHR) system 106, a thermal battery system (TBS) 114, and a rear axle heat exchanger (RAHX) 118 for warming differential lubricant (also referred to as rear axle lubrication oil) at a rear axle 132 of a vehicle in which the coolant system is installed.

The direction of coolant flow along the coolant line 102 and the associated systems may be regulated by one or more three-way valves. In one embodiment, the flow of coolant downstream of the EGHR 106 may be regulated by a three-way valve 110. The valve 110 may regulate the flow of coolant to the TBS 114. The flow of coolant through the RAHX 118 may be regulated by coolant three-way valve 116, upstream of the RAHX 118. The valves 110 and 116 may be three-way valves splitting the coolant flow in two different flow paths. The coolant line 102 may be fluidically coupled to a degas bottle/tank 122. The coolant after degassing in the degas tank may be available in the coolant line 102 connecting to the fluid pump 104 for further recirculation. A rear axle 132 may be lubricated with rear axle lubrication oil, which may flow through the RAHX 118 in order to be in heat exchange relationship with the coolant at the RAHX 118.

An internal combustion engine emits hot exhaust gases through an exhaust system using exhaust pipes. The coolant loop is brought into heat exchange relation with the exhaust gas to scavenge heat from the exhaust gas for storage in the TBS 114. The EGHR system 106 may include an exhaust gas heat exchanger (EGHX) 108 capable of transferring heat from a flow of exhaust gas from an internal combustion engine 140 to the coolant. The hot gas stream may be the exhaust gas from a diesel engine, a gasoline engine, or other suitable engine. In one example, the exhaust gas flows through the EGHX at an exhaust passage 126. The exhaust passage 126 may receive exhaust gas from an exhaust manifold of the engine or other exhaust component. In other examples, the EGHX may receive exhaust gas from another suitable source, as from the exhaust manifold or directly from one or more cylinders. Further, in some examples EGHX may recover exhaust heat via coolant flow from the cylinder head or cylinder block. Engine 140 may be cooled by an engine coolant system 142 including at least one pump, radiator, corresponding coolant lines, and/or other components. Coolant in engine coolant system 142 may flow through one or more coolant jackets of the engine. Coolant in engine coolant system 142 may be maintained separately from coolant in coolant line 102, at least in some examples.

The EGHR system 106 recovers heat from the flow of exhaust gas and transfers the heat to the coolant flowing through the coolant line 102 through the EGHX 108. The hot exhaust gas may be routed from the exhaust passage 126 to the EGHX 108 through a gas bypass valve 128. The bypass valve 128 may be controlled by the controller based on feedback from a temperature sensing device, which may sense the temperature of the exhaust gasses. The controller may signal to actuate the bypass valve 128 at a predetermined exhaust gas temperature, diverting the exhaust gases to the EGHX 108 for heat exchange with the coolant. The bypass valve 128 shuts off the flow of the exhaust gas to the EGHX 108 when heat exchange is no longer desired, such as when exhaust gas temperature is below a threshold or when the thermal battery is full of hot coolant. The hot exhaust gasses may pass through the EGHX 108, which may transfer heat from the hot exhaust gas to the coolant in coolant line 102, coupled to the EGHX 108. The cooled exhaust gas after the heat exchange with the coolant through the EGHX 108 may be delivered back to the exhaust passage 126 and then passed to downstream components and in some examples to atmosphere.

In general, a heat exchanger offers additional resistance to the exhaust gas flowing through the exhaust system, leading to a pressure drop. This pressure drop adds to the backpressure of the exhaust system, which is to be kept low to achieve good engine performance. The pressure drop across the EGHX 108 of the cooling system 100 may be monitored directly or indirectly, and may be relayed to the controller controlling the bypass valve 128. In one example, the pressure drop signal may be obtained by directly measuring the pressure drop by a pressure sensor positioned at the EGHX. In another example, the pressure drop may be extrapolated from other parameters, such as exhaust gas flow rate and exhaust gas temperature, which are already known to be monitored in vehicles during engine operation. One example the exhaust gas mass flow may be calculated based on intake air mass flow and the amount of injected fuel, which in turn allows for the calculation of a pressure drop across the heat exchanger system. Another example includes calculation of the exhaust gas mass flow based on engine speed. Other ways of indirectly determining the pressure drop across the heat exchanger could be used as well. Depending on the pressure drop across the EGHX, the controller may control the exhaust bypass valve 128. In one example, when the pressure drop across the EGHX is relatively high (e.g. above a threshold), the bypass valve 128 may prevent flow of the exhaust gasses through the EGHX 106. In another example, the bypass valve may allow only part of the exhaust gas to flow through the EGHX, and the remaining exhaust gas may be routed through the exhaust passage. The threshold pressure drop may depend on various factors including engine type and specific hardware, and in some examples may be relatively low (e.g., three kPa or less). As such small pressure drops may be difficult for pressure sensors to detect, the pressure drop estimations described above may provide for accurate estimations, at least in some examples.

Downstream of the EGHX 108, the coolant flow may be regulated by the coolant valve 110. The coolant valve 110 may be a three-way valve having an inlet for receiving coolant flow via coolant line 102 from the EGHR system 106, and two separate and distinct outlet conduits. In one example, the first outlet conduit of the coolant valve 110 may be along the coolant line 102, directing the coolant flow towards the RAHX 118 and the coolant pump 104. The second outlet of the coolant valve 110 may direct coolant flow towards the thermal battery system 114 through the thermal storage system inlet 115a. The thermal battery system 114 may store excess thermal energy from the coolant. In one example, the thermal battery system (TBS) 114 may store heat in a phase-change material (PCM) that absorbs heat when changing state from solid to liquid and releases heat when changing state from liquid to solid, and may be insulated to reduce dissipation of heat stored therein. In another example, TBS 114 may include an insulated tank for storing heated coolant for later use. In an example, TBS 114 may be insulated via a vacuum jacket. The thermal battery system 114 may provide the stored excess thermal energy back to the coolant line 102 through a thermal battery outlet 115b. A coolant valve 116 may regulate the flow of the coolant through the RAHX 118. Similar to coolant valve 110, the coolant valve 116 may have one inlet conduit and two distinct outlet conduits. A first outlet may direct coolant to the RAHX 118 while a second outlet may direct the coolant towards the pump 104, bypassing the RAHX 118.

The coolant system 100 may be coupled to and regulated by input from multiple sensors. In one embodiment, the coolant system 100 may include a first temperature sensor 112 and a second temperature sensor 120 for sensing the temperature of the coolant in the coolant line 102. In one embodiment, the temperature sensor 112 may be positioned in the coolant line 102 downstream of the EGHX 108 and the TBS 114. The second temperature sensor 120 may be placed on the coolant line downstream of the RAHX 118. The temperature sensors 112 and 120 may be electronically coupled to a controller, and may be configured to send a signal indicating the temperature of the coolant thereto.

Controller 12 is shown in FIG. 1 as a microcomputer, including microprocessor unit 14, input/output ports 16, an electronic storage medium for executable programs and calibration values shown as non-transitory read only memory chip 18 in this particular example for storing executable instructions, random access memory 20, keep alive memory 22, and a data bus. Controller 12 may receive various signals from sensors 15 coupled within the coolant system, in addition to those signals previously discussed. Controller 12 may comprise a single unit, or controller 12 may be comprised of multiple units in communication with each other. In one example, controller 12 may be the same controller that controls various aspects of engine function, such as fuel injection. In other examples, controller 12 may be separate from the engine controller, but may be configured to receive signals from the engine controller, such as exhaust gas flow rate, exhaust gas temperature, etc. The controller 12 receives signals from the various sensors of FIG. 1 and employs the various actuators, including actuators 81 and others previously described, of FIG. 1 to adjust system operation based on the received signals and instructions stored on a memory of the controller. As an example, the controller may receive the signal from the temperature sensor 112 and determine if the sensed temperature of the coolant is less than, equal to, or greater than a pre-defined temperature. The control module then signals the control valve 110, based on the determination that the temperature of the coolant is less than, equal to, or greater than the pre-defined temperature, to direct the flow of the coolant along one or more of a fluid flow path towards the RAHX 118 or to a second fluid flow path to the TBS 114. A position of valve 110 may be controlled by an actuator, such as a solenoid, stepper motor, etc., configured to receive commands from the controller.

Similarly, the controller may receive the signal from the temperature sensor 120, sensing the coolant temperature downstream of the RAHX 118, and may determine if the sensed temperature of the coolant is less than, equal to, or greater than a pre-defined temperature. The control module may then signal the control valve 116 to direct the flow of the coolant along one or more of a fluid flow path to the RAHX 118 for heat exchange or to a second fluid flow path bypassing the heat exchanger, as illustrated in the schematic in FIG. 1. A position of valve 116 may be controlled by an actuator, such as a solenoid, stepper motor, etc., configured to receive commands from the controller.

The controller may be configured to estimate various operating parameters of the system 100. In one example, the controller may estimate the coolant flow rate in coolant line 102 based on the input of the temperature sensor 120 at the outlet of the RAHX 118 and based on the position of the three-way valves 110 and 116 upstream of the TBS 114 and the RAHX 118, respectively. The controller may estimate the fluid outlet temperature at the EGHX based on exhaust gas temperature and the exhaust gas flow rate and based on the coolant flow rate. The EGHX pressure drop estimation may be made by the controller based on exhaust gas temperature and exhaust gas flow rate. The controller may be configured to estimate the TBS internal temperature and potential TBS fluid outlet temperature based on coolant flow rate and a comparison of an estimated TBS inlet temperature and a measured TBS outlet temperature by the temperature sensor 112. The rear axle lubrication oil temperature may be estimated by the controller based on coolant flow rate and based on input from the temperature sensor 120 at the RAHX outlet. In this way, by relying on estimation of various coolant system parameters, the number of sensors in the system may be reduced, thus reducing system cost and complexity.

Further, in some examples fluid pump 104 may be controlled by controller 12. Fluid pump 104 may be controlled to be on or off, and in some examples may be controlled to have variable displacement, thus adjusting coolant flow rate in coolant line 102.

FIG. 2 shows an example method 200 of controlling coolant flow through a rear axle coolant system to regulate the rear axle lubrication oil temperature. FIG. 3 shows a method 300, a continuation of the method 200 of FIG. 2, controlling coolant flow through the rear axle coolant system when the rear axle lubrication oil temperature is not overheated. Instructions for carrying out methods 200 and 300 included herein may be executed by a controller (e.g., controller 12) and stored on a memory of the controller and in conjunction with signals received from sensors of the coolant system, such as the sensors described above with reference to FIG. 1. The controller may employ actuators of the coolant system to adjust system operation, according to the methods described below.

During execution of method 200, the controller may receive signals from specified components of a rear axle coolant system of a vehicle, such as the system 100 of FIG.

1. The controller may control the functional mode of each component of the coolant system based on the signals received from the rear axle coolant system. The rear axle coolant system controlled according to method 200 may be the coolant system 100 illustrated in FIG. 1, including the coolant line 102 coupled to the coolant pump 104, the EGHX 108, the TBS 114 and the RAHX 118. The coolant system 100 also includes the exhaust bypass valve 128, the TBS valve 110, and the RAHX valve 116. The exhaust bypass valve 128 may be controllable to a first position, where the exhaust bypass valve bypasses exhaust gas around the EGHX and to a second position, where the exhaust bypass valve directs the exhaust gas to the EGHX. The TBS valve 110 may be controllable a first position, where the TBS valve directs coolant flow to bypass TBS and to a second position, where the TBS valve directs the coolant flow to the TBS. The RAHX valve 116 may be controllable to a first position where the RAHX valve directs coolant flow to bypass the RAHX, and to a second position where the RAHX valve directs coolant to flow through the RAHX. The coolant system may also include the temperature sensor 112 downstream of the TBS 114 and the temperature sensor 120 downstream of the RAHX 118, as illustrated in FIG. 1. The controller carrying out method 200 may be the controller 12 of FIG. 1.

The method 200 includes, at 202, detecting engine operating parameters, including detecting if the engine is turned on, a duration for which the engine is on, engine speed, engine load, engine temperature, etc. At 204, the coolant system is in a default mode. In one example, the default mode may include the pump 104 of the coolant system 100 being turned on (e.g., at engine start-up), but no coolant flows in the TBS or the RAHX, and exhaust gas does not flow through the EGHX. In an example, the rear axle coolant system may be in the default mode before various parameters are estimated by the controller, including the rear axle lubrication oil temperature, the EGHX temperature, the EGHX pressure drop, the TBS temperature, and the RAHX temperature. In one example, the rear axle coolant system may be in default mode at engine start.

At 206, a rationality check is performed. As an example, the rationality check may be performed based on a preprogrammed routine for checking the valves, the temperature sensors, and the pump associated with the coolant system. The rationality check may only be performed during certain operating conditions, such as during or following an engine start, during engine shutdown, or during default system operation (e.g., when no rear axle lubrication heating or cooling is commanded). Thus, in some examples of method 200, performing the rationality check may be dispensed with. In one example, the rationality check may include testing the functionality of each valve of the coolant system. An example of a three-way valve check routine may include, monitoring a temperature sensor downstream of the valve in response to the position of the three-way valve and the status of a heating source coupled to the valve. In another example, the coolant pump function may be monitored by turning the pump on and off and monitoring resultant changes in output from the temperature sensors. In one example, the rationality check may include determining if pump output is at an expected output and/or if valve position is at an expected position based on positional feedback from actuators associated with the pump and the valves. The temperature sensor functionality may be monitored by regulating a heat source upstream of a temperature sensor, for example, flowing hot exhaust gas into the EGHX will increase the temperature reading of a sensor immediately downstream of the EGHX, and thus if the temperature sensor output does not change, it may be indicated that the sensor is degraded.

In one example, the rationality check may be performed after a vehicle has been inactive for a period of time, such as an overnight soak. The sensor readings of the coolant system may be compared to each other, and the sensors may be indicated as being functional if the readings agree within a margin of error. Furthermore, when the system is in a neutral (e.g., default) state, the coolant system may not be in a heat exchange mode. With the pump operating and the valves of the coolant system positioned to bypass any coolant heat exchange, the sensor readings of the coolant system may be compared and the sensors may be indicated as being functional if the sensor readings may agree within a margin of error.

At 208, method 200 assesses if the pump and the valves associated with the rear axle coolant system are functioning. If the valves and/or pump are not functioning, the method 200 proceeds to 218 to enter a degradation mode for the rear axle coolant system. In one example, the degradation mode may be due to a single valve associated with the rear axle coolant system not functioning, for example clogged passage way of the valve 110 of FIG. 1. In another example, the degradation mode 218 may be due to the coolant pump 104 not functioning. In other examples, the degradation mode may be due to combination of a valve and pump degradation or to multiple valves experiencing degradation. The degradation mode may include notifying an operator and/or storing a diagnostic code in the memory of the controller. In another example, after detection of degradation mode, the rear axle coolant system may be disabled. In another example, if the degradation mode is not due to a faulty pump, the degradation mode may maintain the rear axle coolant system operation in the default mode. Method 200 then returns.

At 208, if the valves and pump associated with the rear axle system are functioning as expected, the method 200 proceeds to 210 to assess if the rear axle lubrication oil temperature is equal to or greater than a threshold temperature. The rear axle lubrication oil temperature may be determined based on coolant flow rate and temperature through the RAHX, as explained above. In other examples, the rear axle lubrication oil temperature may be measured by a temperature sensor in a line flowing the rear axle lubrication oil or other suitable location. The threshold temperature may be a temperature at which the rear axle lubrication may be over-heated above the normal temperature of the rear axle. In one example, the normal operating temperature may be any temperature within a specified temperature range (e.g., 200-250° F.) and the threshold temperature for overheating may be 5 degrees greater than the upper limit normal temperature. In another example, the threshold temperature may be 10 degrees over the upper limit normal temperature. When the rear axle lubrication oil temperature is above a specified threshold (for example, lubrication oil heating up at high engine speed), the lubrication oil may lose its viscosity characteristics ideal for optimal rear axle gear lubrication, thereby increasing friction loss and wear of the rear axle gears, which may ultimately result in reduced fuel efficiency.

If at 210, the lubrication oil temperature is not greater than or equal to the threshold temperature, method 200 proceeds to 220, which will be explained in detail below. If the rear axle oil temperature is equal to or greater than the threshold temperature at 210, the method 200 proceeds to 212 to assess if the temperature of the TBS is less than the rear axle lubrication oil temperature. For example, the temperature of the TBS 114 may be assessed by the temperature sensor 112 at the TBS outlet 115b, as illustrated in FIG. 1. If the TBS 114 temperature is less than the rear axle lubrication oil temperature, the method 200 proceeds to 214 to operate in a first rear axle cooling mode. The first rear axle cooling mode of 214 includes the pump being on, thus pumping coolant that flows in the coolant line 102. As the coolant is to be used to cool the over-heated rear axle lubrication oil, additional heat recovery from the exhaust gas by the coolant at the EGHX is not desirable. Hence, the exhaust bypass valve is in the first position, shutting off exhaust gas flow into the EGHX. Thus, the coolant flowing through the EGHX does not capture any additional heat from the EGHX.

As the coolant flows towards the rear axle heat exchanger, additional heat may be removed from the coolant by flowing the coolant through the TBS, as the TBS has a lower temperature than the rear axle lubrication oil. A three-way valve, such as the valve 110 of FIG. 1, may regulate the flow of the coolant into the TBS 114. In one example, the valve 110 may be in the second position, directing all the coolant flow to the TBS. In another example, the valve 110 may be in an intermediate position, between the valve first position and the valve second position, directing a part of the coolant to the TBS 114, while the remaining coolant may bypass the TBS 114. In one example, the TBS 114 storage capacity and/or temperature and the temperature of the rear axle lubrication oil may determine the volume of coolant flowing through the TBS 114. The lower temperature coolant from the TBS may flow through the TBS outlet 115b and into the RAHX 118 through the valve 116 in a second position. The coolant at the RAHX 118 is in heat exchange relationship with the over-heated rear axle lubrication oil and may absorb excessive heat from the over-heated rear axle lubrication oil, cooling down the rear axle lubrication oil to the desired normal temperature.

In one example, all of the coolant may be directed to the RAHX 118 by the upstream valve 116, while in another example, a part of the coolant may bypass the RAHX 118. The volume of coolant entering the RAHX versus the volume of coolant bypassing the RAHX 118 may be determined by the over-heated rear axle lubrication oil temperature. For example, if the temperature of rear axle lubrication oil temperature is 15 degrees over the threshold temperature, the controller may regulate the valve 116 to a second position to flow all the coolant through the RAHX 118. In contrast, if the rear axle lubrication oil temperature is 5 degrees over the threshold temperature, the RAHX valve 116 may be in an intermediate position, such that 35 percent of the coolant may flow through the rear axle heat exchanger, while the remaining coolant may bypass the RAHX.

If at 212, the TBS temperature is not less than the rear axle lubricating oil temperature, the method 200 may proceed to 216 to operate in a second rear axle cooling mode, where the coolant flow is maintained by the pump 104, no heat recovery occurs from the exhaust gas by the coolant the EGHX 108 as the EGHX valve 128 is in the first position (no exhaust gas is received at the EGHX), the coolant flow bypasses the TBS 114 (the TBS valve 110 is in the first position), as the temperature of the TBS is not lower than the rear axle lubrication oil temperature, and the coolant flows directly to the RAHX 118 through the RAHX valve 116 in the second position to cool the rear axle lubrication oil.

As mentioned earlier, at 210 if the rear axle oil temperature is less than the threshold temperature, the method 200 proceeds to 220, which is a normal mode of the coolant system. In the normal mode, the rear axle oil temperature is not over-heated (not above the threshold temperature). In one example, the normal mode may at least temporarily include operation in the default mode until conditions, based on estimation and sensor input parameters, indicate operation in a different mode. The temperature of the rear axle coolant system in the normal mode is further regulated by the method 300 as explained below with respect to FIG. 3.

FIG. 3 illustrates a method 300 of operation in the normal mode where the engine is on, the rear axle lubrication oil is not over-heated, and the valves and pump associated with the rear axle coolant system are not faulty. The method 300 starts at 302, where the rear axle coolant loop (coolant system 100 of FIG. 1) may be in the default mode, as explained above with respect to FIG. 2.

At 304, method 300 assesses if the rear axle lubrication oil temperature is below a specified temperature, for example, if the rear axle lubrication oil is colder than a normal operating temperature that may result in the lubrication oil being more viscous than desired. As discussed previously with reference to FIG. 2, when rear axle lubrication oil temperature is above a threshold temperature, more than the optimal normal temperature, the rear axle lubrication oil is over-heated. In contrast, at 304 of method 300, if the lubrication oil temperature is below the specified temperature (e.g., less than the lower limit of the normal operating temperature range), the rear axle oil is colder than desired and is thus warmed up to the normal operating temperature. At 304, if rear axle lubrication oil temperature is not below the specified temperature, the method 300 proceeds to 320, which will be explained in detail below.

At 304, if the rear axle temperature is below the specified temperature, the method 300 proceeds to 306 to assess if the exhaust gas pressure drop across the EGHX is less than a threshold value. In one example, the pressure drop across the EGHX may be calculated indirectly based on exhaust gas flow rate and based on temperature relayed to the controller, as discussed previously in reference to FIG. 1. If the pressure drop across the EGHX is not less than the threshold, method 300 proceeds to 316, which will be explained in more detail below.

If the pressure drop in the EGHX is less than the threshold, the method 300 proceeds to 308, to assess if TBS outlet temperature is more than the EGHX outlet temperature. In one example, in the coolant system 100 of FIG. 1, the TBS outlet temperature may be assessed by the temperature sensor 112 and compared to the EGHX outlet temperature estimated based on exhaust gas temperature and exhaust gas flow rate. If the TBS outlet temperature is not more than the EGHX outlet temperature, method 300 proceeds to 314 to operate in mode 2, which will be described in more detail below. If TBS outlet temperature is more than EGHX outlet temperature, the method proceeds to 310, and assesses if the temperature of TBS outlet is more than the rear axle lubrication oil temperature.

If at 310, the TBS outlet temperature is more than the rear axle lubrication oil temperature, method 300 proceeds to 312 to operate the components of the rear axle coolant system in a first mode. In the first mode, the system is operated to deplete the stored heat from the TBS, deliver the stored heat to the RAHX to heat the rear axle lubrication oil, and then recover heat from the exhaust system. As such, in the first mode, the pump is on, directing the coolant to the EGHX. The coolant is in heat exchange relationship with the exhaust gas flowing into the EGHX, through the EGHX valve in the second position. The coolant recovers heat from the hot exhaust gas flowing through the EGHX. The heated coolant from the EGHX flows to the TBS through the TBS valve. The coolant depletes at least a part of the excess heat energy from the TBS. The heated coolant exiting the TBS flows to the RAHX through the RAHX valve in the second position, to warm the rear axle lubrication oil to a desired operating temperature.

The TBS flow in the first mode may be regulated by the valve 110 upstream of TBS 114, as illustrated in FIG. 1. In one example, the valve 110 may direct only part of the coolant to the TBS 114. In another example, it may deliver all of the coolant to the TBS 114. The valve 110 position may depend on TBS 114 storage status (e.g., minimal storage left, maximum storage available etc.) and/or TBS temperature. The flow of coolant through the valve 110 into the TBS may also be regulated by the demand of coolant downstream of the TBS 114, for example rear axle oil temperature 20° below desired temperature may prompt depletion of a large amount of heat energy by the coolant from the TBS to meet the need for warmer coolant at the RAHX 118. In another example, if the rear axle oil temperature is only 5° below the desired temperature, only a part of the coolant may be passed through the TBS to deplete some heat energy stored in the TBS. As discussed in reference to FIG. 1, the position of the valves 110 and 116 may be regulated by the controller 12 via respective actuators based on estimations done by the controller as described previously with reference to FIG. 1. Method 300 then returns.

Returning to 306, if the pressure drop at EGHX is less than threshold and at 308 if the TBS outlet temperature is not more than EGHX outlet, the method 300 proceeds to 314 to operate in a second mode of the coolant system. In the second mode, the pump is on and pumping coolant through the EGHX to recover heat from the hot exhaust gas (the EGHX valve is in the second position). The coolant flowing out of the EGHX bypasses the TBS (the TBS valve is in the first position) and flows to the RAHX through the RAHX valve in the second position. The coolant flowing through the coolant system in the second mode at 314 recovers heat from the exhaust gas at the EGHX and delivers it to the RAHX to warm the rear axle lubrication oil, bypassing the TBS. The position of the valves (e.g., valves 110 and 116) may be regulated by the controller receiving input and estimating various parameters associated with the second mode.

The method 300 may also place the rear axle coolant system in the second mode 314 if at 310 the TBS outlet temperature is less than the rear axle lubrication oil temperature. The cold rear axle lubrication oil may be warmed in the second mode, as described above, by pumping the coolant to recover heat energy from the EGHX. The coolant bypasses the TBS and flows to the RAHX to deliver the heat energy to the rear axle lubrication oil.

Again returning to 306, if the pressure drop at the EGHX is not less than threshold, the method 300 proceeds to 316 to assess if the TBS outlet temperature is more than rear axle lubrication oil temperature. If no, the method 300 returns to the default mode of 302. If yes, the method 300 proceeds to 318 to operate in a third mode of the coolant system. In the third mode, the pump is on. The coolant is not in heat exchange relationship with the exhaust gas at the EGHX as the bypass valve is in the first position, preventing exhaust gas from entering the EGHX as the pressure drop of the EGHX is above the threshold. The coolant flows to the TBS through the TBS valve in the second position, where at least part of the heat energy is depleted from the TBS. The warmer coolant, after depleting heat from the TBS, exits the TBS and flows to the RAHX to warm the rear axle lubrication oil to a desired operating temperature range. Thus in the third mode, the coolant system is depleting heat energy stored in the TBS and delivering the warmed coolant to the RAHX to warm the rear axle lubrication oil to the desired temperature.

The coolant flow to the TBS may be directed by the valve 110 upstream of the TBS 114. In one example, all of the coolant may be directed to the TBS 114 through the TBS valve 110 in the second position. The coolant may deplete maximum possible energy from the TBS and flow towards the RAHX to warm up the lubrication oil at the RAHX. The flow of coolant through the RAHX 118 may be regulated by the valve 116 upstream of the RAHX. In one example, all of the coolant may flow to the RAHX 118 if the rear axle lubrication oil temperature is very low and immediate warm up is required. In other example, when the rear axle lubrication oil temperature is moderately low, a part of the coolant may bypass the RAHX 118, flowing towards the coolant pump.

Returning to 304, if the rear axle lubrication oil temperature is more than the specified temperature, for example, the rear axle lubrication oil temperature is in the normal functional range and is not cold or over-heated, the method 300 proceeds to 320 to assess the EGHX pressure drop. If at 320, the EGHX pressure drop is more than the threshold, the method 300 returns. In one example, the method 300 returns to the default mode at 302. If the EGHX pressure drop is below the threshold, the method proceed to 322 to assesses if the TBS temperature is less than a specified threshold. The TBS internal temperature or the TBS outlet temperature may be compared to the threshold temperature. At 322, if TBS temperature is more than the threshold, the method 300 returns. In one example, the method 300 may return to the default mode of 302. If at 322 the TBS temperature is less than the threshold temperature, the method operates in a fourth mode at 324. In one example, the specified threshold temperature may be a designated operating temperature of the TBS.

In the fourth mode at 324, the coolant pump is on. The coolant is in a heat exchange relationship with the exhaust gas at the EGHX (the EGHX valve is in the second position). The coolant exiting the EGHX is directed to flow into the TBS by the TBS valve in the second position. The excess heat energy from the coolant is stored in the TBS. In one example, the amount of heat energy removed from the coolant by the TBS may depend on the storage/heat absorbing capacity of the TBS. The coolant exiting the TBS bypasses the RAHX (the RAHX valve is in the first position), as the rear axle lubrication oil temperature is already at desired normal temperature and no temperature regulation is required at the RAHX. The rear axle coolant system in the fourth mode is thus recovering additional heat from the exhaust gas flow and storing it in the TBS for meeting the possible future heat requirements of the rear axle coolant system. Method 300 then returns.

Referring now to FIG. 4, example plots show the positions of components of a rear axle coolant system, including pump operation, and valve positions of an EGHX bypass valve, a TBS valve, and a RAHX valve. The rear axle coolant system may be the coolant system 100 illustrated in FIG. 1. Map 402 shows pump operation (on or off). Maps 404, 406, and 408 show the positions of the EGHX valve, the TBS valve, and the RAHX valve of the rear axle coolant system, respectively. A first position of the valve directs coolant flow in a first direction and a second position of the valve directs coolant flow in a second direction. Intermediate positions of the valves may be possible, directing part of the coolant flow in the first direction and the remaining coolant flow in the second direction. For each of the valve positions and the pump operation mode, corresponding rear axle lubrication oil temperature, EGHX pressure drop, EGHX outlet temperature, and TBS temperature are also indicated in maps 410, 412, 416, and 414, respectively. The vertical markers indicate the various modes of the rear axle coolant system operation and the time is represented along the X-axis of the plots.

As illustrated in FIG. 4, at 420 the coolant system is in a first mode operation. At 422, the coolant system is in a third mode and at 424, the coolant system is in a second mode of operation. The coolant system is in a fourth mode at 426 and at 428, the coolant system is in an over-heated mode (also referred to as the rear axle cooling mode). The specifics of each of the coolant system modes will be discussed below. A controller may position the different components of a rear axle coolant system based on sensor input and estimations associated with each component of the coolant system, as discussed previously with reference to FIGS. 1-3.

In the first mode 420, the rear axle oil temperature may be below a specified temperature T1 as shown by map 410. The temperature T1 may be the lower limit temperature for normal functioning of the rear axle lubrication oil. When the lubrication oil temperature is below T1, the lubrication oil is cold and needs to be warmed to reach operating temperature. In one example, at engine cold start the rear axle lubrication oil temperature may be below specified temperature T1.

The EGHX pressure drop 412 in the first mode 420 is below a threshold P1. The TBS temperature is more than the rear axle oil temperature and the TBS temperature is more than the EGHX outlet temperature. In the first mode 420, to warm the rear axle oil, the coolant pump is on. The EGHX bypass valve is in the second position, flowing the exhaust gas into the EGHX. The coolant flows into the EGHX to recover heat from the exhaust gas. The coolant exiting the EGHX flows to the TBS through the TBS valve in the second position, depleting heat stored in the TBS. The warmer coolant exiting the TBS flows to the RAHX through the RAHX valve in the second position to warm the rear axle oil to the desired normal temperature T1.

In one example, the EGHX pressure drop may exceed the threshold P1, which may transition the coolant system from the first mode 420 to the third mode 422. In the third mode 422, the rear axle lubrication oil temperature 410 is still below the threshold T1. In the third mode 422, the EGHX pressure drop 412 is more than the threshold P1, the TBS temperature 414 is more than EGHX outlet temperature 416 and the TBS temperature 414 is more than the rear axle oil temperature. When the EGHX pressure drop is above the threshold P1, flowing the exhaust gas through the EGHX may increase the backpressure on the engine, which is not desired for smooth engine operation. In the third mode 424, the pump is on. The EGHX bypass valve is in the first position blocking the hot exhaust gas from entering the EGHX. The TBS valve is in the second position directing coolant flow to the TBS. The coolant depletes the stored heat from the TBS. The warmed coolant exits the TBS and flows to the RAHX through the RAHX valve in the second position. The warmer coolant in the RAHX warms the rear axle lubrication oil to reach the optimal specified temperature T1.

As the third mode 422 proceeds, coolant flowing through the TBS depletes the stored heat from the TBS. The coolant system at this point may transition from the third mode 422 to the second mode 424 to bypass the TBS. In the second mode 424, the rear axle oil temperature is still below the threshold T1 and continues to be warmed up. The EGHX pressure drop 412 is less than the threshold P1. The TBS temperature is less than the EHGX outlet temperature 416 and is less than the rear lubrication oil temperature 410 due to energy depletion from the TBS during previous coolant system modes. The controller receiving signal input and estimating the above described parameters positions the rear axle coolant system in the second mode 424. In the second mode 424, the pump is on. The EGHX bypass valve is in the second position, directing hot exhaust gas to the EGHX for warming the coolant flowing through the EGHX. The TBS valve is in the first position bypassing the TBS, and flowing coolant towards the RAHX. The coolant flows to the RAHX through the RAHX valve in the second position. Thus, in the second mode 424, the coolant recovers heat from the exhaust gas and delivers it to the RAHX for warming the rear axle lubrication oil.

As the coolant system proceeds from the first mode, to the third mode, and to the second mode, the rear axle lubrication oil temperature keeps increasing and reaches the specified temperature T1, placing the coolant system in the fourth mode 426. In the fourth mode of the rear axle coolant system, the rear axle lubrication oil temperature 410 is at the specified normal temperature T1 and does not require heating or cooling at the RAHX. The EGHX pressure drop 412 is below the threshold P1 and the TBS temperature 414 is less than the EGHX outlet temperature 416 and is less than rear axle lubrication oil temperature 410. The controller positions the coolant system in the fourth mode 426, where the pump is on. The EGHX bypass valve is in the second position with the exhaust gas entering the EGHX. The coolant flowing through the EGHX recovers heat from the exhaust gas and flows through the TBS valve in the second position. The TBS converts and stores the excess heat energy from the coolant in the TBS for meeting future energy demands of the coolant system. The coolant exiting the TBS bypasses the RAHX. The RAHX valve is in the first position directing the coolant away from the RAHX, towards the coolant pump.

Under some conditions, the rear axle lubrication oil may increase in temperature to a second threshold temperature, for example during high load engine operation at high ambient temperature, at which point the system may operate in the over-heated mode. In the over-heated mode 428, the rear axle lubrication oil temperature 410 is over the threshold temperature T2. In the over-heated mode 428, the coolant pump is on. The EGHX valve is in the first position, blocking the hot exhaust gas from entering the EGHX. The coolant bypasses the TBS with the TBS valve in the first position, as the TBS temperature is more than the rear axle oil temperature. The coolant flows to the RAHX through the RAHX valve in the second position to cool the rear axle lubrication oil at the RAHX.

Thus, rear axle lubrication oil temperature may be regulated by controlling the components of a rear axle coolant system. The mode of the rear axle coolant system may be controlled based on input from the coolant system to the controller, including the coolant flow rate, and the coolant temperature at specific points of the coolant loop. The controller may regulate the coolant flow to recover heat energy from the EGHX, to store excess energy of the coolant in the TBS or to deplete stored energy from the TBS, and to deliver the coolant to RAHX to meet the cooling or heating needs of the rear axle lubrication oil.

The technical effect of regulating the temperature of the rear axle lubrication oil may include optimal lubrication of the rear axle gears, ensuring smooth operation and reduced wear and friction loss of the gears, along with enhanced fuel efficiency.

An example rear axle coolant system, includes an exhaust heat recovery system to transfer heat from an engine exhaust system to a cooling fluid, a rear-axle heat exchanger to transfer heat between the cooling fluid and rear axle lubrication oil and a thermal battery system positioned intermediate the exhaust heat recovery system and the rear-axle heat exchanger, the thermal battery system configured to store excess heat from the exhaust heat recovery system. In a first example of the system, a controller storing instructions executable to, responsive to a first condition, bypass exhaust gas around the exhaust gas heat recovery system and flow cooling fluid from the thermal battery system to the rear-axle heat exchanger and responsive to a second condition, bypass exhaust gas around the exhaust gas heat recovery system and flow cooling fluid from the exhaust gas heat recovery system to the rear-axle heat exchanger. A second example of the system optionally includes the first example and further includes wherein the first condition comprises rear axle lubrication oil temperature above a threshold temperature and thermal battery system temperature lower than the rear axle lubrication temperature, and wherein the second condition comprises rear axle lubrication oil temperature above the threshold temperature and thermal battery system temperature equal to or greater than the rear axle lubrication temperature. A third example of the system optionally includes one or more of the first and second examples, and further includes wherein the threshold temperature is a first threshold temperature, and wherein the controller includes further instructions executable to, responsive to a rear axle lubrication oil temperature below a second threshold temperature, lower than the first threshold temperature, direct exhaust gas to the exhaust gas heat recovery system and flow heated cooling fluid from the exhaust gas heat recovery system to the rear-axle heat exchanger. A fourth example of the system optionally includes one or more of the first through third examples, and further includes a first valve positioned upstream of the rear axle heat exchanger, wherein responsive to rear axle lubrication oil temperature being in a range of temperatures between the first threshold temperature and the second threshold temperature, the controller is configured to adjust the first valve to a first position to direct cooling fluid to bypass the rear axle heat exchanger, and responsive to the first condition and the second condition, the controller is configured to adjust the first valve to a second position to direct cooling fluid to the rear axle heat exchanger. A fifth example of the system optionally includes one or more of the first through fourth examples, and further includes a second valve upstream of the thermal battery system, the second valve configured to bypass cooling fluid around the thermal battery system responsive to the second condition, and direct cooling fluid to the thermal battery system responsive to the first condition. A sixth example of the system optionally includes one or more of the first through fifth examples, and further includes wherein the exhaust heat recovery system includes an exhaust gas heat exchanger configured to receive exhaust gas and the cooling fluid and an exhaust gas bypass valve controlling flow of exhaust gas to the exhaust gas heat exchanger, and wherein the controller is configured to actuate the exhaust gas bypass valve to a first position to direct exhaust gas to the exhaust gas heat exchanger, and actuate the exhaust gas bypass valve to a second position to bypass the exhaust gas around the exhaust gas heat exchanger. A seventh example of the system optionally includes one or more of the first through sixth examples, and further includes wherein the controller is configured to adjust the exhaust gas bypass valve responsive to an exhaust gas pressure drop across the exhaust gas heat exchanger. An eighth example of the system optionally includes one or more of the first through seventh examples, and further includes a first temperature sensor downstream of the thermal battery system and a second temperature sensor downstream of the rear axle heat exchanger. A ninth example of the system optionally includes one or more of the first through eighth examples, and further includes wherein the controller is configured to determine rear axle lubrication oil temperature based on cooling fluid flow rate and temperature measured by the second temperature sensor and determine thermal battery system temperature based on cooling fluid flow rate and temperature measured by the first temperature sensor. A tenth example of the system optionally includes one or more of the first through ninth examples, and further includes a pump to circulate cooling fluid.

An example method includes, during a first condition, recovering exhaust gas heat at an exhaust gas heat exchanger via coolant in a coolant loop and storing the recovered exhaust gas heat in a thermal battery system and responsive to a second condition, transferring heat from the thermal battery system to rear axle lubrication oil via a rear axle heat exchanger. A first example of the method includes wherein the first condition comprises rear axle lubrication oil temperature above a threshold temperature, and wherein the second condition comprises rear axle lubrication oil temperature below the threshold temperature and the thermal battery system temperature equal to or greater than the rear axle lubrication oil temperature. A second example of the method optionally includes the first example, and further includes responsive to a third condition, bypassing the thermal battery system and transferring heat from the exhaust gas heat exchanger to the rear axle lubrication oil via the rear axle heat exchanger, wherein the third condition comprises rear axle lubrication oil temperature below a threshold temperature and thermal battery system temperature below the rear axle lubrication oil temperature. A third example of the method optionally includes one or more of the first and second examples, and further includes wherein during the second condition, when a pressure drop across the exhaust gas heat exchanger is greater than a threshold pressure, bypassing exhaust gas around the exhaust gas heat exchanger. A fourth example of the method optionally includes one or more of the first through third examples, and further includes responsive to a fourth condition including rear axle lubrication oil temperature above a maximum threshold temperature and thermal battery temperature below the rear axle lubrication oil temperature, transferring heat from the rear axle lubrication oil to the thermal battery system by flowing coolant through the rear axle heat exchanger and to the thermal battery system, and bypassing exhaust gas around the exhaust gas heat exchanger.

A further example of the rear axle coolant system includes, an exhaust heat recovery system to transfer heat from an engine exhaust system to a cooling fluid, a rear-axle heat exchanger to transfer heat between the cooling fluid and rear axle lubrication oil, a thermal battery system positioned intermediate the exhaust heat recovery system and the rear-axle heat exchanger, the thermal battery system configured to store excess heat from the exhaust heat recovery system and a controller storing instructions executable to, responsive to a first condition, transfer exhaust gas heat to a cooling fluid via the exhaust gas heat recovery system and flow the cooling fluid to the thermal battery system and to the rear-axle heat exchanger and responsive to a second condition, transfer exhaust gas heat to the cooling fluid via the exhaust gas heat recovery system and flow the cooling fluid from the exhaust gas heat recovery system to the rear-axle heat exchanger, bypassing the thermal battery system. A first example of the system includes, wherein the first condition comprises rear axle lubrication oil temperature below a threshold temperature and the thermal battery system temperature higher than the rear axle lubrication oil temperature, and wherein the second condition comprises rear axle lubrication oil temperature below the threshold temperature and the thermal battery system temperature less than the rear axle lubrication oil temperature. A second example of the system optionally includes the first example, and further includes wherein responsive to a third condition including rear axle lubrication oil temperature at an operating temperature and the thermal battery system not at maximum heat storing capacity, the controller is configured to flow cooling fluid through the exhaust gas recovery system to recover heat from the exhaust gas and to flow the cooling fluid to the thermal battery system to store heat energy from the cooling fluid in the thermal battery system, and to flow the cooling fluid to bypass the rear axle heat exchanger. A third example of the system optionally includes one or more of the first and second examples, and further includes, wherein responsive to a fourth condition including rear axle lubrication oil temperature at an operating temperature and the thermal battery system at maximum heat storing capacity, the controller is configured to flow cooling fluid through a cooling loop with no heat transfer to and from the cooling fluid at the exhaust gas heat exchanger, at the thermal battery system and at the rear axle heat exchanger.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising;
responsive to a first condition, where the first condition includes a rear axle lubrication oil temperature that is above a threshold temperature and a thermal battery system outlet temperature that is less than an exhaust gas heat exchanger outlet temperature, recovering exhaust gas heat at an exhaust gas heat exchanger via coolant in a coolant loop and storing the recovered exhaust gas heat in a thermal battery system via the coolant; and
responsive to a second condition, where the rear axle lubrication oil temperature is below the threshold temperature in the second condition, transferring heat from the thermal battery system to rear axle lubrication oil via the coolant at a rear-axle heat exchanger, wherein the coolant in the coolant loop is maintained separate from engine coolant in an engine coolant system.

2. The method of claim 1, wherein the second condition further comprises a thermal battery system temperature equal to or greater than the rear axle lubrication oil temperature.

3. The method of claim 2, further comprising, responsive to a third condition, bypassing the thermal battery system and transferring heat from the exhaust gas heat exchanger to the rear axle lubrication oil via the rear-axle heat exchanger, wherein the third condition comprises the rear axle lubrication oil temperature below the threshold temperature and thermal battery system temperature below the rear axle lubrication oil temperature.

4. The method of claim 1, wherein during the second condition, when a pressure drop across the exhaust gas heat exchanger is greater than a threshold pressure, bypassing exhaust gas around the exhaust gas heat exchanger.

5. The method of claim 1, further comprising, responsive to a fourth condition including the rear axle lubrication oil temperature above a maximum threshold temperature and a thermal battery system temperature below the rear axle lubrication oil temperature, transferring heat from the rear axle lubrication oil to the thermal battery system by flowing coolant through the rear-axle heat exchanger and to the thermal battery system, and bypassing exhaust gas around the exhaust gas heat exchanger.

6. The method of claim 1, wherein the threshold temperature is a lower limit normal temperature for the rear axle lubrication oil, the lower limit normal temperature being less than a maximum temperature threshold of the rear axle lubrication oil, and wherein the rear axle lubrication oil temperature is less than the maximum temperature threshold.

7. The method of claim 1, further comprising performing a functionality assessment of a pump and valves associated with a coolant system of the rear axle lubrication oil.

8. The method of claim 7, further comprising, responsive to any one or combination of the pump and the valves not functioning, disabling the coolant system of the rear axle lubrication oil.

9. The method of claim 7, further comprising maintaining the coolant system of the rear axle lubrication oil in a default mode responsive to determining that the pump is functioning and that one or more of the valves are not functioning.

10. The method of claim 9, wherein the engine coolant is flowed through one or more coolant jackets of an engine.

11. A rear axle coolant system, comprising:
- an exhaust heat recovery system to transfer heat from an engine exhaust system to a coolant in a coolant loop via an exhaust gas heat exchanger;
- a rear-axle heat exchanger to transfer heat between the coolant and rear axle lubrication oil;
- a thermal battery system positioned intermediate the exhaust heat recovery system and the rear-axle heat exchanger, the thermal battery system configured to store excess heat from the exhaust heat recovery system; and
- a controller storing instructions executable to:
  - responsive to a first condition, where the first condition includes a rear axle lubrication oil temperature that is above a threshold temperature and a thermal battery system outlet temperature that is less than an exhaust gas heat exchanger outlet temperature, recover exhaust gas heat at the exhaust gas heat exchanger via the coolant in the coolant loop via the exhaust heat recovery system and store the recovered exhaust gas heat in the thermal battery system via the coolant and
  - responsive to a second condition, where the rear axle lubrication oil temperature is below the threshold temperature in the second condition, transfer heat from the thermal battery system to rear axle lubrication oil via the coolant at the rear-axle heat exchanger, wherein the coolant in the coolant loop is maintained separate from engine coolant in an engine coolant system.

12. The system of claim 11, wherein heat from the thermal battery system to the rear axle lubrication oil is transferred via the rear axle heat exchanger.

13. The system of claim 12, wherein, responsive to a third condition including rear axle lubrication oil temperature at an operating temperature and the thermal battery system below maximum heat storing capacity, the controller is configured to flow coolant through the exhaust heat recovery system to recover heat from exhaust gas and to flow the coolant to the thermal battery system to store heat energy from the coolant in the thermal battery system, and after flowing through the thermal battery system, to bypass the coolant around the rear-axle heat exchanger.

14. The system of claim 12, wherein, responsive to a fourth condition including rear axle lubrication oil temperature at an operating temperature and the thermal battery system at maximum heat storing capacity, the controller is configured to flow coolant through the exhaust heat recovery system while bypassing exhaust gas around the exhaust heat recovery system, bypassing the thermal battery system and the rear-axle heat exchanger.

* * * * *